United States Patent [19]

Schiller et al.

[11] Patent Number: 4,775,167
[45] Date of Patent: Oct. 4, 1988

[54] DEVICE FOR CONTROLLING EXTENDABLE ELEMENTS OF POWER VEHICLE

[75] Inventors: Herbert Schiller, Bühlertal; Eckhard Ursel, Bühl, both of Fed. Rep. of Germany

[73] Assignee: Robert Bosch GmbH, Stuttgart, Fed. Rep. of Germany

[21] Appl. No.: 33,034

[22] Filed: Mar. 30, 1987

[30] Foreign Application Priority Data

May 15, 1986 [DE] Fed. Rep. of Germany ....... 3616452

[51] Int. Cl.$^4$ ............................................ B60R 22/00
[52] U.S. Cl. ..................................... 280/808; 297/481
[58] Field of Search ............... 280/801, 802, 804, 808; 297/481, 483

[56] References Cited

U.S. PATENT DOCUMENTS

| 4,084,841 | 4/1978 | Hayashi et al. | 280/802 |
| 4,213,638 | 7/1980 | Sacco et al. | 280/808 |
| 4,629,214 | 12/1986 | Föhl | 280/808 |
| 4,650,215 | 3/1987 | Sasaki et al. | 280/808 |
| 4,684,153 | 8/1987 | Miller | 280/808 |

Primary Examiner—John J. Love
Assistant Examiner—Karin L. Ferriter
Attorney, Agent, or Firm—Michael J. Striker

[57] ABSTRACT

A device for controlling an extendable equipment part of a power vehicle such as a safety belt includes a guide member displaceable between two end positions. In order to enable a passenger in the car to easily adjust the safety belt the guide member is held on a stationary hinge by means of which the movement of a drive aggregate is translated into the pivoting motion of the guide member.

9 Claims, 2 Drawing Sheets

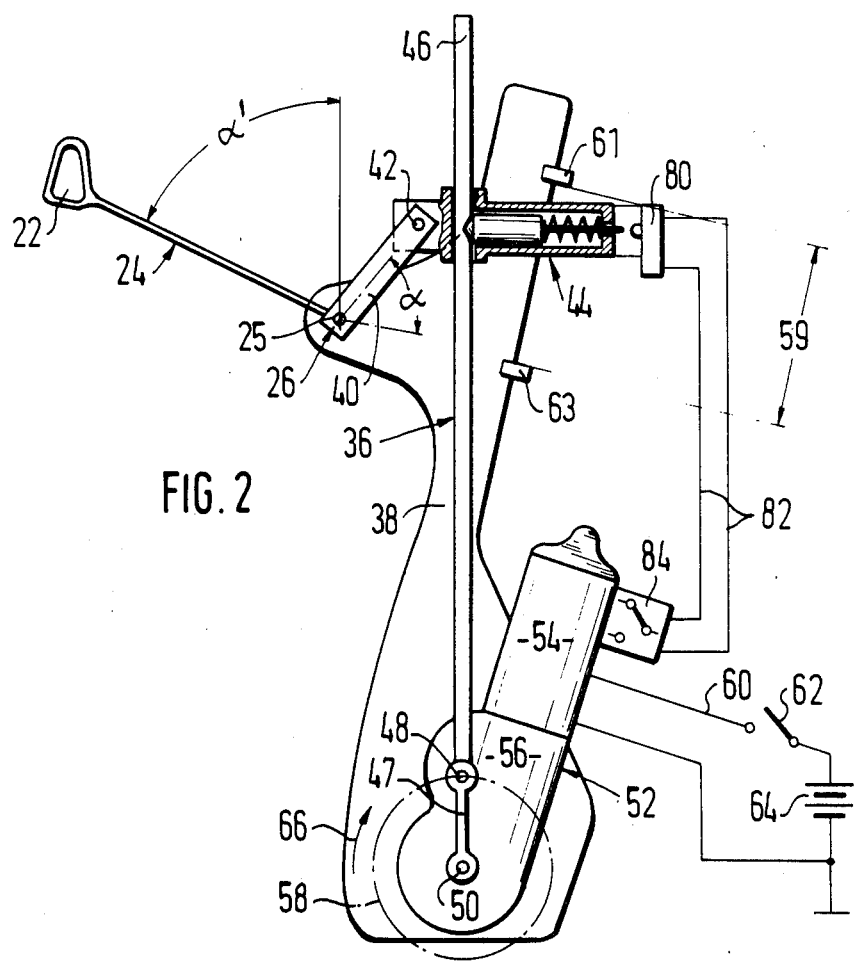
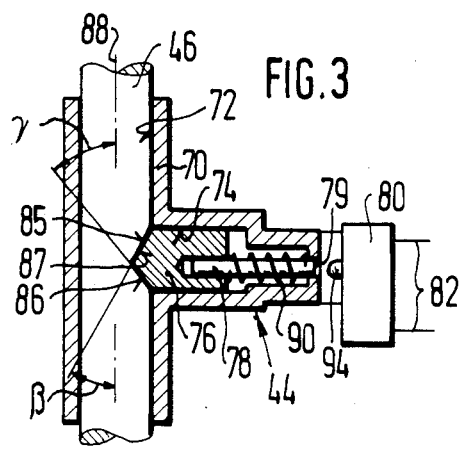
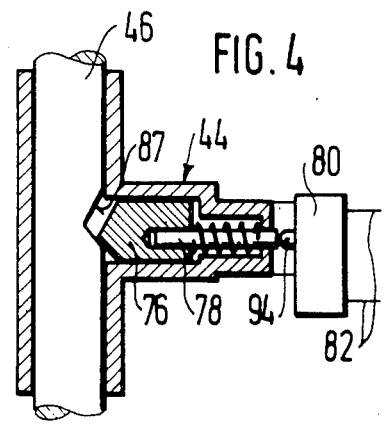

DEVICE FOR CONTROLLING EXTENDABLE ELEMENTS OF POWER VEHICLE

BACKGROUND OF THE INVENTION

The present invention relates to a device for controlling or adjusting an extendable element such as a safety belt of a power vehicle by a guide member which is movable between two end positions.

The device of the type under consideration has been disclosed in U.S. Pat. No. 4,388,575. In this conventional device the guide member for the safety belt is controlled. The guide member must provide or offer to a person on the front seat of the passenger car a safety belt so that the guide member can easily seize the belt lug which can be locked in the belt lock. During the resetting motion of the guide member from the so-called "offer" position the guide member can narrow down the floor space for the person present on the rear seat of the passenger car because during this resetting motion this person moves in that floor space.

SUMMARY OF THE INVENTION

It is an object of the present invention to provide an improved device for controlling an extendable component, such as a safety belt of a power vehicle.

It is another object of this invention to provide a controlling device which would ensure that the guide member of the safety belt is positioned in its inoperative position almost vertically so that this position can be accommodated in the neutral area between the front seats and rear seats. With the power vehicles with four doors it is also possible to position the guide member of the safety belt on the central column or support of the vehicle body or between the doors.

These and other objects of the invention are attained by a device for controlling an extendable structural component such as a safety belt of a power vehicle, comprising a guide member for guiding said safety belt; an electric drive aggregate for moving said guide member between two end positions, said guide member having an end portion, and a stationarily positioned hinge which holds said end portion, said hinge being operatively connected to said drive aggregate so as to impart to said guide member a drive movement of said aggregate as a pivoting motion.

The guide member has a free end portion opposite to said end portion and may have thereon a guide for the safety belt.

The device may further include a rocking arm rigidly connected to said guide member and supported at one end thereof on said hinge.

The hinge may have a bearing sleeve rigidly connected to a body of the vehicle; the device further including an oscillating shaft guided in said bearing sleeve, said oscillating shaft being rigidly connected to said guide member and said rocking arm.

The device may further include a coupling rod having a first end portion hingedly connected to a free end of said rocking arm, said drive aggregate having a driven crank, said coupling rod having a second end portion hingedly connected to said crank.

The device may further include an overload safety means positioned on said coupling rod.

The device may include a frame receiving said coupling rod, said rocking arm being hingedly connected to said frame, said overload safety means being mounted to said frame.

The safety means may include a locking element positioned in said frame and being spring-biased relative to said coupling rod, said frame being held on said coupling rod by said locking element which is elastically withdrawable from said coupling rod against a spring force.

The locking element may be wedge-shaped at an end thereof facing said coupling rod, said rod having a groove matched to said wedge-shaped end which is situated in said groove.

The groove may have two wedge surfaces each including with an axis of elongation of said coupling rod an acute angle, one of said angles being greater than another.

The device may further include an electric circuit connected to an electric motor of said drive aggregate and including a switch, said locking element cooperating with said switch.

The device may further include a spring for biasing said locking element, a force of said spring being adjustable.

The device may further include a base element for mounting thereon of the controlling device, said base element and the controlling device being insertable in the power vehicle.

The pivot axis of said hinge and said guide member may be positioned at least horizontally and transversely to the direction of travel of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a schematic view of an adjustment device for a guiding member leading to a safety belt of a power vehicle of FIG. 1;

FIG. 3 is a sectional partial view of an overload safety device for the adjustment device of FIG. 2, on enlarged scale; and FIG. 4 is a sectional view of the overload safety device of FIG. 3 in a released position.

DETAILED DESCRIPTION OF THE PREFERRED EMBODIMENT

Figure 1:
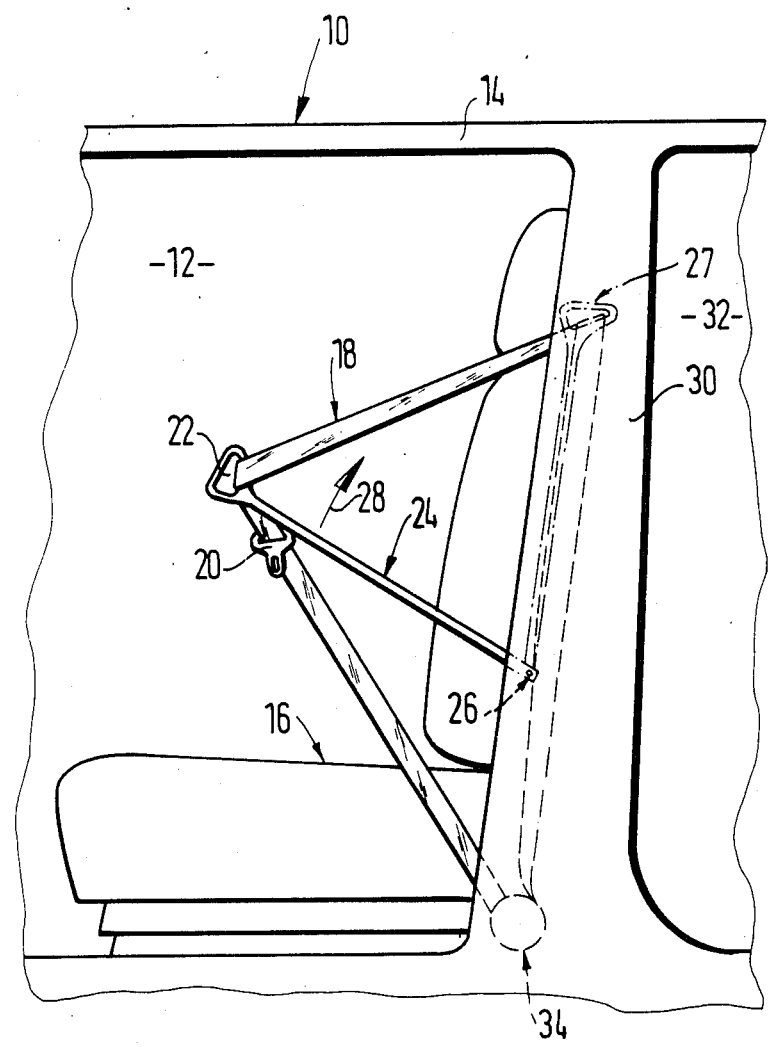
FIG. 1 is a partial side view of a power vehicle with a removed door.

Referring now to the drawings in detail, reference numeral 10 designates a power vehicle shown partially. A front seat 16 is seen through a door opening 12 of the vehicle body 14. A safety belt 18 corresponds to the front seat 16.

The safety belt 18 includes a holding lug 20 which can be inserted into and locked in a belt lock located near front seat 16. The safety belt 18 extends through a guide opening 22 of an elongated structural part 24 which forms a guide member for the safety belt 18. This guide member at the end thereof which faces away from the guide opening 22 is connected to the body of the vehicle by a hinge 26 and is swingably supported. The pivot axis of the guide member 24 is substantially horizontal and is positioned transversely to the direction of travel of the power vehicle 10.

The guide member 24 is shown in FIG. 1 in the operation position in a so-called "offer" position in which it is relieved by a person sitting on the front seat to accept the safety belt 18 and to lock the belt lug 20 in the belt lock. Then the guide member 24 pivots in the direction of arrow 28 to the position 27 shown by dash-dotted line in FIG. 1 so that this guide member is then located within a central column or support 30 which is positioned between the front vehicle body opening 12 and a rear body opening 32.

In the exemplified embodiment, a so-called belt roller 34 is positioned in the central support 30. Roller 34 serves to release or roll up the safety belt 18. The operation of the guide member 24 is effected by an adjustment device 36 which is illustrated in detail in FIG. 2.

With reference to FIG. 2, it will be seen that the guide member 24 for the safety belt 18 can be moved in the hinge 26. The adjustment device 36 therefore has a chassis-like base element 38 in which a shaft 25 is supported so that it can pivot or oscillate. The guide member 24 and a rocking arm 40 are rigidly connected with shaft 25. The connection between the guide member 24 and the rocking arm 40 is thereby rigid. The rocking arm 40 is a one-arm lever, on the free end of which an overload safety device 44 is pivotally supported at a bearing 42. The overload safety device 44 is locked or secured with an elongated coupling rod 46. One end of the coupling rod 46 is pivotally connected to an oscillating or rotating driven crank 47. The latter is situated with its end which faces away from a pivot axis 48 on a drive shaft 50 of a drive aggregate 52. The drive aggregate 52 has in the exemplified embodiment an electric drive motor 54 to which a reduction gear 56 is connected. The driven shaft 50 forms an output of the reduction gear 56. The pivot axis 48 between the crank 47 and coupling rod moves over a circle. An electric circuit 60 corresponds to the drive motor 54. This electric circuit includes a current source 64 and a main switch 62.

When the main switch 62 is closed the crank of the drive aggregate 52 rotates in the direction of arrow 66. Since the drive aggregate 52 and the hinge 26 are arranged as stationary structural components the drive aggregate 52 is rigidly connected to the base element 38 so that a so-called four-bar linkage results which includes the hinge 26, hinge pivot axis 42, hinge connection 48 and the driven shaft 50. Upon rotation of the crank 47, the coupling rod 46 moves so that its end provided with the hinge axis 48 describes the circle 58 whereas its other end is guided by the rocking arm 40 to the hinge 46. The rocking arm 40 oscillates by an angle α which is about 60 degrees about the hinge 26. At the same time, the guide member 24 also oscillates or swings by a corresponding angle α' between two end positions. Thereby the so-called "offer" position is formed in the operation position of the guide member 24 as shown in FIGS. 1 and 2. In this "offer" position, the safety belt 18 is offered to a person sitting on the front seat 16. After the belt lug 20 has been locked in the belt lock 20 a sensor positioned in that lock can automatically cause restoring or resetting of the guide member 24 to its inoperative position 27 shown by dash-dotted line in FIG. 1. In this position the direction of rotation is changed by the drive motor 54. The overload safety device 44 must preclude between the rocking arm 40 and the coupling rod 46 that the objects or equipment parts which happen to occur in the pivoting path of the guide member 24, can injure or hurt a person present in the vehicle. Thereby the overload safety device, as shown in FIG. 3, has a frame part 70 which has a slide guide 72 for the coupling rod 46. Transversely to the guide 72 for the coupling rod is slidably guided in a guide passage 74 formed in the frame part 70, a spring-biased locking element 76. The locking element 76 is provided with an actuating pin 78 which extends from the end of the locking element which faces away from the coupling rod 46 and is guided in a bore 79 formed in the frame part 70. At the distance from the free end of pin 78 which is remote from the locking element 76, is positioned a switch element 80, the switching contacts of which lie in the control electric circuit 82 connected to the electric motor 54. Further, a switch-over element 84 (FIG. 2) is positioned in the control electric circuit 82. Upon the actuation of the switch-over element 84 the direction of rotation of electric motor 54 is switched over.

As seen specifically in FIG. 3, the end of the locking element 76 which faces the coupling rod 46, is conical. This conical end is situated in a groove 86 provided in the coupling rod 46 and adjusted to that end of the locking element 76. Both wedge surfaces 85 and 86 of the locking element 76 include with the axis of elongation 88 of the coupling rod angle β and angle ν, respectively. A helical compression spring 90 which surrounds the guiding pin 78 is pre-stressed and presses the locking element with its wedge-like end into the wedge-shaped groove 87 of the coupling rod 46. Thereby angles β and ν can be chosen so that they would have different values, and the control resolution of the overload safety device 44 can be adjusted to predetermined requirements which during the so-called "offer" movement can be different as during the resetting movement (arrow 28).

When now the guide member 24 during its pivotal movement (α') against resistance acting on this member and this resistance is exceeded by the holding force of the prestressed helical compression spring 90 between the locking element 76 and the coupling rod 46, the locking element 76 will be partially pushed out from the groove 87 whereby it will move from its operation position (FIG. 3) to the position shown in FIG. 4. Thereby the wedge-shaped portion of the locking element 76 will be positioned partially outside the groove 87 of the coupling rod 46. Thus, the locking element 76 will slide against the stressing force of the helical compression spring 90 and the guiding pin 78 will press against the switch button 94 of the switch element 80. The switch-over element 84 will be actuated and the drive motor 54 will switch the direction of its rotation so that crank 47 will rotate in the opposite direction. Thus, the guide member 24 will also naturally move in the oppsite direction so that the object found in the path of pivoting α' will be released.

If due to circumstances the guide member falls out from the pivoted out position (FIG. 1) because it can automatically switch off after a number of pivoting motions, the guide member 24 can be pivoted by hand to its inoperative position 27 or to any chosen position. Thereby the spring-biased locking element 76 becomes disengaged from the wedge 86 of the coupling rod and slides towards the coupling rod 46. Stops 61 and 63 (FIG. 2), spaced at a distance 59 from each other, are secured to the base element 38 in the direction of elongation of the coupling rod 46. The distance 59 corresponds to the diameter of circumference 58. Stops 61 and 63, upon a repeated switching after the disengagement of the locking element serve for cooperation of the drive aggregate 52 with the frame part 70 so that the sliding locking element 76 is held opposite the wedge 86. By the displace ment of the coupling rod 46 in the guide 72 of the frame part 70, the locking element 76 and groove 87 are locked with each other.

Owing to the arrangement of the above described overload safety device the requirement of operation safety is satisfied.

The operation motion, that is pivoting angle $\alpha'$ of the guide member 24, is performed substantially between two dead center positions of crank 47, in which the motor 54 is switched off. The resetting movement can be carried out, as described above, by the switching over of the direction of rotation of the motor. It is also possible to obtain the resetting of the guide member by retention of the direction of rotation of the motor.

It will be understood that each of the elements described above, or two or more together, may also find a useful application in other types of devices for controlling elongated elements of power vehicle, such as safety belt and the like differing from the types described above.

While the invention has been illustrated and described as embodied in a device for controlling elongated elements of power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention.

What is claimed as new and desired to be protected by Letters Patent is set forth in the appended claims

1. A device for controlling an extendable structural component such as a safety belt of a power vehicle, comprising a guide member for guiding said safety belt; an electric drive aggregate for moving said guide member between two end positions, said guide member having an end portion; a stationarily positioned hinge which holds said end portion; said hinge being operatively connected to said drive aggregate so as to impart to said guide member a drive movement of said aggregate as a pivoting motion, said hinge including a rocking arm rigidly connected to said guide member; an oscillating shaft (25); means for supporting said oscillating shaft, said oscillating shaft being rigidly connected to said guide member and said rocking arm; a coupling rod (46) having a first end portion hingedly connected to a free end of said rocking arm, said drive aggregate (52) having a driven crank (47), said coupling rod having a second end portion hingedly connected to said crank; an overload safety means (44) positioned on said coupling rod; and a frame (7) receiving said coupling rod, said rocking arm being hingedly connected to said frame, said overload safety means being mounted to said frame.

2. The device as defined in claim 1, wherein said guide member has a free end portion opposite to said end portion and having thereon a guide (22) for the safety belt.

3. The device as defined in claim 1, wherein said safety means include a locking element (76) positioned in said frame and being spring-biased relative to said coupling rod, said frame being held on said coupling rod by said locking element which is elastically withdrawable from said coupling rod against a spring force.

4. The device as defined in claim 3, said locking element being wedge-shaped at an end thereof facing said coupling rod, said rod having a groove matched to said wedge-shaped end which is situated in said groove.

5. The device as defined in claim 4, wherein said groove has two wedge surfaces each including with an axis of elongation of said coupling rod an acute angle $(\beta,\nu)$, one of said angles being greater than another.

6. The device as defined in claim 3, further including an electric circuit connected to an electric motor of said drive aggregate and including a switch, said locking element cooperating with said switch (80, 84).

7. The device as defined in claim 3, further including a spring (90) for biasing said locking element, a force of said spring being adjustable.

8. The device as defined in claim 3, said supporting means including a base element (38) for mounting thereon of the controlling device, said base element and the controlling device being insertable in the power vehicle.

9. The device as defined in claim 3, wherein a pivot axis of said hinge and said guide member is positioned at least horizontally and transversely to the direction of travel of the vehicle.

* * * * *